(12) United States Patent
Roy et al.

(10) Patent No.: US 9,662,615 B2
(45) Date of Patent: May 30, 2017

(54) COMPOSITE POLYAMIDE MEMBRANE

(71) Applicant: Dow Global Technologies LLC, Midland, MI (US)

(72) Inventors: Abhishek Roy, Edina, MN (US); Tina L. Arrowood, Elko New Market, MN (US); Robert C. Cieslinski, Midland, MI (US); Derek M. Stevens, Chanhassen, MN (US); David D. Hawn, Midland, MI (US); Steven D. Jons, Eden Prairie, MN (US); Mou Paul, Edina, MN (US); Martin H. Peery, Bloomington, MN (US); Steven Rosenberg, Shorewood, MN (US); Ian A. Tomlinson, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 129 days.

(21) Appl. No.: 14/405,711

(22) PCT Filed: Jul. 3, 2013

(86) PCT No.: PCT/US2013/049177
§ 371 (c)(1),
(2) Date: Dec. 4, 2014

(87) PCT Pub. No.: WO2014/014663
PCT Pub. Date: Jan. 23, 2014

(65) Prior Publication Data
US 2015/0151255 A1 Jun. 4, 2015

Related U.S. Application Data

(60) Provisional application No. 61/775,777, filed on Mar. 11, 2013, provisional application No. 61/673,462, (Continued)

(51) Int. Cl.
B01D 69/12 (2006.01)
B01D 67/00 (2006.01)
(Continued)

(52) U.S. Cl.
CPC ....... *B01D 67/0006* (2013.01); *B01D 61/025* (2013.01); *B01D 67/0002* (2013.01);
(Continued)

(58) Field of Classification Search
None
See application file for complete search history.

(56) References Cited

U.S. PATENT DOCUMENTS 3,304,310 A 2/1967 Hari et al.
3,686,116 A 8/1972 Rio
(Continued)

FOREIGN PATENT DOCUMENTS

WO 2012102943 8/2012
WO 2013048762 4/2013
(Continued)

OTHER PUBLICATIONS

Li et al, Polyamide thin film composite membranes prepared from isomeric biphenyl tetraacyl chloride and m-phenylenediamine, Journal of Membrane Science 315, (2008) 20-27.
(Continued)

*Primary Examiner* — Erma Cameron
(74) *Attorney, Agent, or Firm* — Edward W. Black

(57) ABSTRACT

A method for making a composite polyamide membrane comprising a porous support and a thin film polyamide layer, wherein the method includes the step of applying a polyfunctional amine monomer and polyfunctional acyl halide monomer to a surface of the porous support and interfacially polymerizing the monomers to form a thin film polyamide layer, wherein the step of applying the polyfunctional acyl
(Continued)

halide monomer to the porous support includes the step of combining the polyfunctional acyl halide monomer with a non-polar solvent at a concentration of at least 0.18 weight percent to form a coating solution which is applied to the surface of the porous support, and wherein the interfacial polymerization is conducted in the presence of a tri-hydrocarbyl phosphate compound which is provided in a molar ratio of at least 0.5:1 with the polyfunctional acyl halide monomer. Many additional embodiments are described including membranes made from the subject method and applications for such membranes.

9 Claims, 2 Drawing Sheets

Related U.S. Application Data filed on Jul. 19, 2012, provisional application No. 61/673,467, filed on Jul. 19, 2012, provisional application No. 61/673,466, filed on Jul. 19, 2012, provisional application No. 61/673,456, filed on Jul. 19, 2012, provisional application No. 61/673,453, filed on Jul. 19, 2012, provisional application No. 61/674,634, filed on Jul. 23, 2012, provisional application No. 61/675,412, filed on Jul. 25, 2012, provisional application No. 61/775,814, filed on Mar. 11, 2013.

(51) Int. Cl.
  *B01D 71/56* (2006.01)
  *B01D 61/02* (2006.01)
  *B01D 69/10* (2006.01)

(52) U.S. Cl.
  CPC ............ *B01D 69/10* (2013.01); *B01D 69/12* (2013.01); *B01D 69/125* (2013.01); *B01D 71/56* (2013.01); *B01D 2323/00* (2013.01); *B01D 2323/38* (2013.01); *B01D 2323/40* (2013.01); *B01D 2325/20* (2013.01)

(56) References Cited

U.S. PATENT DOCUMENTS

| | | | |
|---|---|---|---|
| 3,878,109 A | 4/1975 | Ikeda et al. | |
| 4,259,183 A | 3/1981 | Cadotte | |
| 4,277,344 A | 7/1981 | Cadotte | |
| 4,529,646 A | 7/1985 | Sundet | |
| 4,606,943 A | 8/1986 | Rak et al. | |
| 4,626,468 A | 12/1986 | Sundet | |
| 4,643,829 A | 2/1987 | Sundet | |
| 4,719,062 A | 1/1988 | Sundet | |
| 4,758,343 A | 7/1988 | Sasaki et al. | |
| 4,761,234 A | 8/1988 | Uemura et al. | |
| 4,769,148 A | 9/1988 | Fibiger et al. | |
| 4,783,346 A | 11/1988 | Sundet | |
| 4,812,270 A | 3/1989 | Cadotte et al. | |
| 4,830,885 A | 5/1989 | Tran et al. | |
| 4,872,984 A | 10/1989 | Tomaschke | |
| 4,888,116 A | 12/1989 | Cadotte et al. | |
| 4,948,507 A | 8/1990 | Tomaschke | |
| 4,950,404 A | 8/1990 | Chau | |
| 4,960,517 A | 10/1990 | Cadotte | |
| 5,015,380 A | 5/1991 | Sundet | |
| 5,015,382 A | 5/1991 | Sundet | |
| 5,019,264 A | 5/1991 | Arthur | |
| 5,049,282 A | 9/1991 | Linder et al. | |
| 5,051,178 A | 9/1991 | Uemura et al. | |
| 5,160,619 A | 11/1992 | Yamaguchi et al. | |
| 5,246,587 A | 9/1993 | Tomaschke | |
| 5,254,261 A | 10/1993 | Tomaschke et al. | |
| 5,290,452 A | 3/1994 | Schucker | |
| 5,336,409 A | 8/1994 | Hachisuka et al. | |
| 5,510,527 A | 4/1996 | Hachisuka et al. | |
| 5,576,057 A | 11/1996 | Hirose et al. | |
| 5,582,725 A | 12/1996 | McCray et al. | |
| 5,593,588 A | 1/1997 | Kim et al. | |
| 5,614,099 A | 3/1997 | Hirose et al. | |
| 5,616,249 A | 4/1997 | Hodgdon | |
| 5,693,227 A | 12/1997 | Costa | |
| 5,733,602 A | 3/1998 | Hirose et al. | |
| 5,744,039 A | 4/1998 | Itoh et al. | |
| 5,783,079 A | 7/1998 | Kumano et al. | |
| 5,843,351 A | 12/1998 | Hirose et al. | |
| 5,876,602 A | 3/1999 | Jons et al. | |
| 5,989,426 A | 11/1999 | Hirose et al. | |
| 6,024,873 A | 2/2000 | Hirose et al. | |
| 6,086,764 A | 7/2000 | Linder et al. | |
| 6,162,358 A | 12/2000 | Li et al. | |
| 6,245,234 B1 | 6/2001 | Koo et al. | |
| 6,280,853 B1 | 8/2001 | Mickols | |
| 6,337,018 B1 | 1/2002 | Mickols | |
| 6,406,626 B1 | 6/2002 | Murakami et al. | |
| 6,464,873 B1 | 10/2002 | Tomaschke | |
| 6,521,130 B1 | 2/2003 | Kono et al. | |
| 6,562,266 B2 | 5/2003 | Mickols | |
| 6,723,241 B2 | 4/2004 | Mickols | |
| 6,723,422 B1 | 4/2004 | Hirose et al. | |
| 6,777,488 B1 | 8/2004 | Araki et al. | |
| 6,878,278 B2 | 4/2005 | Mickols | |
| 7,279,097 B2 | 10/2007 | Tomioka et al. | |
| 7,806,275 B2 | 10/2010 | Murphy et al. | |
| 7,815,987 B2 | 10/2010 | Mickols et al. | |
| 7,882,963 B2 | 2/2011 | Mickols et al. | |
| 7,918,349 B2 | 4/2011 | Mickols et al. | |
| 8,002,120 B2 | 8/2011 | Niu et al. | |
| 8,147,735 B2 | 4/2012 | Buschmann | |
| 8,177,978 B2 | 5/2012 | Kurth et al. | |
| 2002/0113008 A1* | 8/2002 | Mickols | B01D 71/56 210/500.38 |
| 2003/0116498 A1* | 6/2003 | Mickols | B01D 69/125 210/483 |
| 2011/0049055 A1 | 3/2011 | Wang et al. | |
| 2011/0284458 A1 | 11/2011 | Mickols et al. | |
| 2012/0248027 A1 | 10/2012 | Sasaki et al. | |
| 2012/0261332 A1 | 10/2012 | Takagi et al. | |
| 2012/0305473 A1 | 12/2012 | Ogawa et al. | |
| 2013/0089727 A1 | 4/2013 | Nilsen et al. | |
| 2013/0126419 A1 | 5/2013 | Ogawa et al. | |
| 2013/0256215 A1 | 10/2013 | Nakatsuji et al. | |
| 2013/0287944 A1 | 10/2013 | Paul et al. | |
| 2013/0287945 A1 | 10/2013 | Roy et al. | |
| 2013/0287946 A1 | 10/2013 | Jons et al. | |
| 2014/0170314 A1 | 6/2014 | Zhang et al. | |
| 2014/0199483 A1 | 7/2014 | Roy et al. | |
| 2014/0206900 A1 | 7/2014 | Qiu et al. | |
| 2014/0272134 A1 | 9/2014 | Roy et al. | |

FOREIGN PATENT DOCUMENTS

| | | |
|---|---|---|
| WO | 2013048763 | 4/2013 |
| WO | 2013048765 | 4/2013 |
| WO | 2013103666 | 7/2013 |
| WO | 2014014662 | 1/2014 |
| WO | 2014014664 | 1/2014 |
| WO | 2014014666 | 1/2014 |
| WO | 2014014668 | 1/2014 |
| WO | 2014014669 | 1/2014 |
| WO | 2014109946 | 7/2014 |
| WO | 2014109947 | 7/2014 |
| WO | 2014179024 | 11/2014 |

OTHER PUBLICATIONS

Petersen, composite reverse osmosis and nanofiltration membranes, Journal of Membrane Science 83, (1993) 81-150.

* cited by examiner

COMPOSITE POLYAMIDE MEMBRANE

FIELD

The present invention is directed toward composite membranes along with methods for making and using the same.

INTRODUCTION

Composite polyamide membranes are used in a variety of fluid separations. One class includes a porous support with a "thin film" polyamide layer. These membranes are commonly referred to as "thin film composite" (TFC) membranes. The thin film layer may be formed by an interfacial polycondensation reaction between polyfunctional amine (e.g. m-phenylenediamine) and poly-functional acyl halide (e.g. trimesoyl chloride) monomers which are sequentially coated upon the support from immiscible solutions, see for example U.S. Pat. No. 4,277,344 to Cadotte. Various constituents may be added to one or both of the coating solutions to improve membrane performance. For example, U.S. Pat. No. 6,878,278 to Mickols describes the addition of tri-hydrocarbyl phosphate compound to the acyl halide coating solution.

While varying the relative quantities of amine and acyl halide monomers can impact membrane performance, increases in the quantity of polyfunctional acyl halide monomer required to react with the amine monomer doesn't generally result in a significant corresponding increase in the acyl halide monomer consumed during polymerization. The present inventors discovered an exception to this phenomenon wherein the quantity of acyl halide monomer consumed during polymerization can be increased, resulting in membranes with unique properties.

SUMMARY

The invention includes thin film composite membranes and methods for making and using the same. In one embodiment, the subject method includes the step of applying a polyfunctional amine monomer and polyfunctional acyl halide monomer to a surface of the porous support and interfacially polymerizing the monomers to form a thin film polyamide layer. The step of applying the polyfunctional acyl halide includes the step of combining the polyfunctional acyl halide monomer with a non-polar solvent at a concentration of at least 0.18 weight percent to form a coating solution which is then applied to the surface of the porous support. The interfacial polymerization is conducted in the presence of a tri-hydrocarbyl phosphate compound provided in a molar ratio of at least 0.5:1 with the polyfunctional acyl halide monomer. In accordance with preferred embodiments of the invention, thin film composite polyamide membranes may be prepared having higher fluxes, greater thicknesses (e.g. in some embodiments greater than 100 nm), or both greater thicknesses and higher flux membranes.

DETAILED DESCRIPTION

Figure 1A:
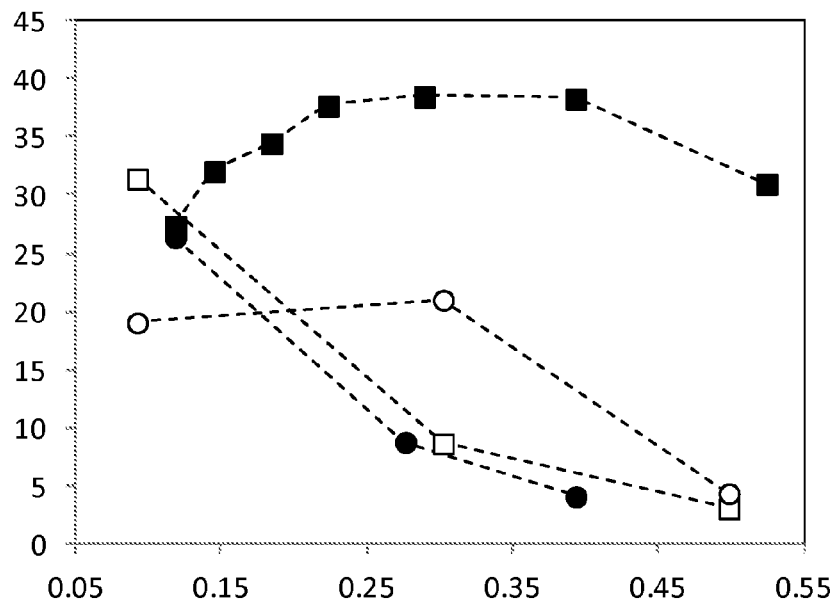
FIG. 1A is a graph corresponding to sample membranes prepared according to Example 1 with trimesoyl chloride reactant concentration plotted as a function of flux (gfd).

The invention includes composite membranes and methods for making and using the same. The invention is not particularly limited to a specific type, construction or shape of composite membrane or application. For example, the present invention is applicable to flat sheet, tubular and hollow fiber polyamide membranes useful in a variety of applications including forward osmosis (FO), reverse osmosis (RO) and nano filtration (NF). RO composite membranes are relatively impermeable to virtually all dissolved salts and typically reject more than about 95% of salts having monovalent ions such as sodium chloride. RO composite membranes also typically reject more than about 95% of inorganic molecules as well as organic molecules with molecular weights greater than approximately 100 Daltons. NF composite membranes are more permeable than RO composite membranes and typically reject less than about 95% of salts having monovalent ions while rejecting more than about 50% (and often more than 90%) of salts having divalent ions—depending upon the species of divalent ion. NF composite membranes also typically reject particles in the nanometer range as well as organic molecules having molecular weights greater than approximately 200 to 500 Daltons.

The subject method involves forming a thin film polyamide layer upon a porous support. The porous support is not particularly limited and preferably includes a polymeric material having pore sizes which are of sufficient size to permit essentially unrestricted passage of permeate but not large enough so as to interfere with the bridging over of a thin film polyamide layer formed thereon. For example, the pore size of the support preferably ranges from about 0.001 to 0.5 µm. Non-limiting examples of porous supports include those made of: polysulfone, polyether sulfone, polyimide, polyamide, polyetherimide, polyacrylonitrile, poly (methyl methacrylate), polyethylene, polypropylene, and various halogenated polymers such as polyvinylidene fluoride.

The thin film polyamide layer is preferably prepared by an interfacial polycondensation reaction between a polyfunctional amine monomer and a polyfunctional acyl halide monomer upon the surface of the porous support as described in U.S. Pat. No. 4,277,344 and U.S. Pat. No. 6,878,278. More specifically, the polyamide membrane layer may be prepared by interfacially polymerizing a polyfunctional amine monomer with a polyfunctional acyl halide monomer, (wherein each term is intended to refer both to the use of a single species or multiple species), on at least one surface of a porous support. As used herein, the term "polyamide" refers to a polymer in which amide linkages (—C(O))NH—) occur along the molecular chain. The polyfunctional amine and polyfunctional acyl halide monomers are most commonly applied to the porous support by way of a coating step from solution, wherein the polyfunctional amine monomer is preferably coated from an aqueous-based or polar coating solution and the polyfunctional acyl halide from an organic-based or non-polar coating solution. Although the coating steps need not follow a specific order, the polyfunctional amine monomer is preferably first coated upon the porous support followed by the polyfunctional acyl halide. Coating can be accomplished by spraying, film coating, rolling, or through the use of a dip tank among other coating techniques. Excess solution may be removed from the support by air knife, dryers, ovens and the like. Once brought into contact with one another, the polyfunctional acyl halide and polyfunctional amine monomers react at their surface interface to form a polyamide layer or film. This layer, often referred to as a polyamide "discriminating layer" or "thin film layer," provides the composite membrane with its principal means for separating solute (e.g. salts) from solvent (e.g. aqueous feed). The reaction time of the polyfunctional acyl halide monomer and the polyfunctional amine monomer may be less than one second but contact times typically range from about 1 to 60 seconds, after which excess liquid may be optionally removed by way of an air knife, water bath(s), dryer or the like. The removal of the excess solution can be achieved by drying at elevated temperatures, e.g. from about 40° C. to about 120° C., although air drying at ambient temperatures may be used.

The polyfunctional amine monomer comprises at least two primary or secondary amino groups and may be aromatic (e.g., m-phenylenediamine, p-phenylenediamine, 1,3,5-triaminobenzene, 1,3,4-triaminobenzene, 3,5-diaminobenzoic acid, 2,4-diaminotoluene, 2,4-diaminoanisole, and xylylenediamine) or aliphatic (e.g., ethylenediamine, propylenediamine, and tris (2-diaminoethyl) amine). Examples of preferred polyfunctional amine monomers include primary amines having two or three amino groups, for example, m-phenylene diamine, and secondary aliphatic amines having two amino groups such as piperazine. One preferred polyfunctional amine is m-phenylene diamine (mPD). The polyfunctional amine monomer may be applied to the porous support as part of a coating solution including a polar solution. The polar coating solution may contain from about 0.1 to about 20 weight percent and more preferably from about 0.5 to about 6 weight percent polyfunctional amine monomer. Once coated on the porous support, excess coating solution may be optionally removed.

The polyfunctional acyl halide monomer comprises at least two acyl halide groups. The polyfunctional acyl halide is not particularly limited and aromatic or alicyclic polyfunctional acyl halides can be used along with combinations thereof. Non-limiting examples of aromatic polyfunctional acyl halides include: trimesic acid chloride, terephthalic acid chloride, isophthalic acid chloride, biphenyl dicarboxylic acid chloride, benzene tetracarboxylic acid chloride, 5,5'-methylene diisophthaloyl diacid chloride, biphenyl tetracarboxylic acid chloride and naphthalene dicarboxylic acid dichloride. Non-limiting examples of alicyclic polyfunctional acyl halides include: cyclopropane tri carboxylic acid chloride, cyclobutane tetra carboxylic acid chloride, cyclopentane tri carboxylic acid chloride, cyclopentane tetra carboxylic acid chloride, cyclohexane tri carboxylic acid chloride, tetrahydrofuran tetra carboxylic acid chloride, cyclopentane dicarboxylic acid chloride, cyclobutane dicarboxylic acid chloride, cyclohexane dicarboxylic acid chloride, and tetrahydrofuran dicarboxylic acid chloride. One preferred polyfunctional acyl halide is trimesoyl chloride (TMC). The polyfunctional acyl halide is preferably applied to the porous support from a coating solution comprising a concentration of at least 0.18, 0.20, 0.22, 0.24, 0.26, 0.28 or even 0.30 weight percent of the polyfunctional acyl halide dissolved within a non-polar solvent. Preferred concentration ranges include from: 0.18 to 4 weight percent, 0.20 to 3 weight percent, 0.22 to 2 weight percent and 0.24 to 1 weight percent. The coating solution may be applied to the porous support as part of a continuous or batch coating operation. Suitable non-polar solvents are those which are capable of dissolving the polyfunctional acyl halide and which are immiscible with water, e.g. hexane, cyclohexane, heptane and halogenated hydrocarbons such as the FREON series. Preferred solvents include those which pose little threat to the ozone layer and which are sufficiently safe in terms of flashpoints and flammability to undergo routine processing without taking special precautions. A preferred solvent is ISOPAR™ available from Exxon Chemical Company. The coating solution may optionally include additional materials including co-solvents, phase transfer agents, solubilizing agents and complexing agents wherein individual additives may serve multiple functions. Representative co-solvents include: benzene, toluene, xylene, mesitylene, ethyl benzene—diethylene glycol dimethyl ether, cyclohexanone, ethyl acetate, butyl Carbitol™ acetate, methyl laurate and acetone.

The subject method includes the step of conducting the aforementioned interfacial polymerization in the presence of a tri-hydrocarbyl phosphate compound. The means of applying the tri-hydrocarbyl phosphate compound to the porous support are not particularly limited, e.g. the tri-hydrocarbyl phosphate compound may be included in one or both of the aforementioned coating solutions or may be coated from a separate coating solution before or during the interfacial polymerization. In a preferred embodiment, the tri-hydrocarbyl phosphate compound is added to the coating solution used to apply the polyfunctional acyl halide to the porous support.

In preferred embodiments, the tri-hydrocarbyl phosphate compound is present during the interfacial polymerization in a molar ratio with the polyfunctional acyl halide of at least 0.25:1, 0.5:1, 1:1, 1.5:1 or 2:1.

Representative examples of applicable tri-hydrocarbyl phosphate compounds are described in U.S. Pat. No. 6,878,278. A preferred class of such compounds includes those represented by Formula (I):

Formula (I)

wherein "P" is phosphorous, "O" is oxygen and $R_1$, $R_2$ and $R_3$ are independently selected from hydrogen and hydrocarbyl groups comprising from 1 to 10 carbon atoms, with the proviso that no more than one of $R_1$, $R_2$ and $R_3$ are hydrogen. $R_1$, $R_2$ and $R_3$ are preferably independently selected from aliphatic and aromatic groups. Applicable aliphatic groups include both branched and unbranched species, e.g. methyl, ethyl, propyl, isopropyl, butyl, isobutyl, pentyl, 2-pentyl, 3-pentyl. Applicable cyclic groups include cyclopentyl and cyclohexyl. Applicable aromatic groups include phenyl and naphthyl groups. Cyclo and aromatic groups may be linked to the phosphorous atom by way of an aliphatic linking group, e.g., methyl, ethyl, etc. The aforementioned aliphatic and aromatic groups may be unsubstituted or substituted (e.g., substituted with methyl, ethyl, propyl, hydroxyl, amide, ether, sulfone, carbonyl, ester, cyanide, nitrile, isocyanate, urethane, beta-hydroxy ester, etc); however, unsubstituted alkyl groups having from 3 to 10 carbon atoms are preferred. Specific examples of tri-hydrocarbyl phosphate compounds include: tripropyl phosphate, tributyl phosphate, tripentyl phosphate, trihexyl phosphate, triphenyl phosphate, propyl biphenyl phosphate, dibutyl phenyl phosphate, butyl diethyl phosphate, dibutyl hydrogen phosphate, butyl heptyl hydrogen phosphate and butyl heptyl hexyl phosphate.

The inventors of the present invention have discovered that conducting the aforementioned interfacial polymerization in the presence of a tri-hydrocarbyl phosphate compound allows increasing quantities of the polyfunctional acyl halide monomer to be consumed during the interfacial polymerization, resulting in a different polymer structure with enhanced water flux. The full benefit of this technical effect has only been observed when using polyfunctional acyl halide monomer concentrations of at least 0.18 wt. % with tri-hydrocarbyl phosphate compounds in molar ratios of at least 0.5:1 with the acyl halide monomer and to a lesser extent with at least 0.25:1. The invention allows for the preparation of thin film composite polyamide membranes having increase flux, greater thicknesses (e.g. over 100 nm), and in preferred embodiments, both thicker and higher flux membranes. Thicker membranes offer improved mechanical strength, chemical resistance and anti-scaling properties. The combination of thicker and higher flux membranes is particularly surprising.

The thin film polyamide layer may optionally include hygroscopic polymers upon at least a portion of its surface. Such polymers include polymeric surfactants, polyacrylic acid, polyvinyl acetate, polyalkylene oxide compounds, poly(oxazoline) compounds, polyacrylamides and related reaction products as generally described in U.S. Pat. No. 6,280,853; U.S. Pat. No. 7,815,987; U.S. Pat. No. 7,882,963, U.S. Pat. No. 7,918,349 and U.S. Pat. No. 8,002,120 and US 2011/0284458. In some embodiments, such polymers may be blended and/or reacted and may be coated or otherwise applied to the polyamide membrane from a common solution, or applied sequentially.

Many embodiments of the invention have been described and in some instances certain embodiments, selections, ranges, constituents, or other features have been characterized as being "preferred." Characterizations of "preferred" features should in no way be interpreted as deeming such features as being required, essential or critical to the invention.

EXAMPLES

Sample membranes were produced using pilot scale membrane manufacturing line. Polysulfone supports were casts from 16.5 wt. % solutions in dimethylformamide (DMF) and subsequently soaked in aqueous solutions of meta-phenylene diamine (mPD). The resulting support was then pulled through a reaction table at constant speed while a thin, uniform layer of a non-polar solution was applied. The non-polar solution included isoparaffinic oil (ISOPAR L), trimesoyl acid chloride (TMC) and in selected examples, tributyl phosphate (TBP). Excess non-polar solution was removed and the resulting composite membrane was passed through water rinse tanks and drying ovens. Concentrations of mPD, TMC and TBP were varied as indicated below. The amount of TMC consumed during the polyamide interfacial reaction was measured by comparing the sample feed TMC concentration (as measured by UV-vis absorbance at 297 nm) against the final concentration of the Isopar L reaction pool after polymerization was complete. This conversion of TMC is converted into a TMC consumption by measuring the quantity of Isopar L applied to the membrane surface. The consumption values are reported in units of mg of TMC per square meter of membrane. Coupons of the sample membranes were subject to standard testing using an aqueous salt solution (2000 ppm NaCl) at 150 psi, pH 8 and 25° C.

Example 1

Figure 1B:
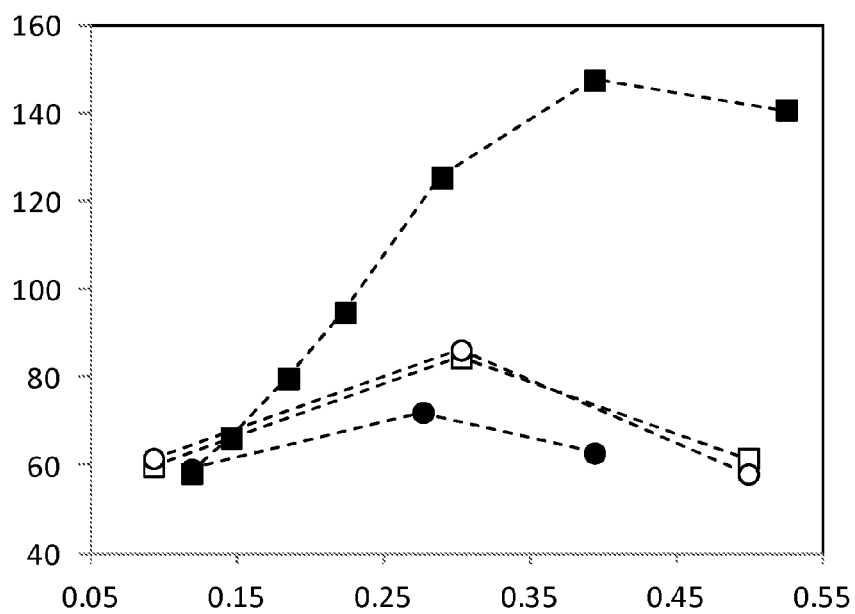
FIG. 1B is a graph corresponding to sample membranes prepared according to Example 1 with trimesoyl chloride reactant concentration plotted as a function of TMC consumption (mg/m$^2$) during interfacial polymerization.

In order to highlight the invention, four series of sample membrane were prepared with each series including samples made using different quantities of TMC (i.e. 0.09 to 0.52 wt. %). The remaining reactant composition of each series is listed below in Table 1 along with a corresponding legend used in FIGS. 1A-B. The resulting flux (GFD) and "TMC consumption" ($mg/m^2$) were determined for each sample and the results are plotted as a function of TMC concentration (wt %) in FIGS. 1A and B, respectively. At lower TMC concentrations, the four curves all show similar TMC consumption and flux values. However, as the TMC concentrations increase, differences among the Series emerge. More specifically, samples including a molar ratio of 1.1:1 TBP to TMC (Series 4) showed significant increases in both flux and TMC consumption as a function of increasing TMC reactant concentration; whereas, sample membranes made with no TBP experienced decreases in flux and showed only moderate changes in TMC consumption.

Example 2

Figure 2A:
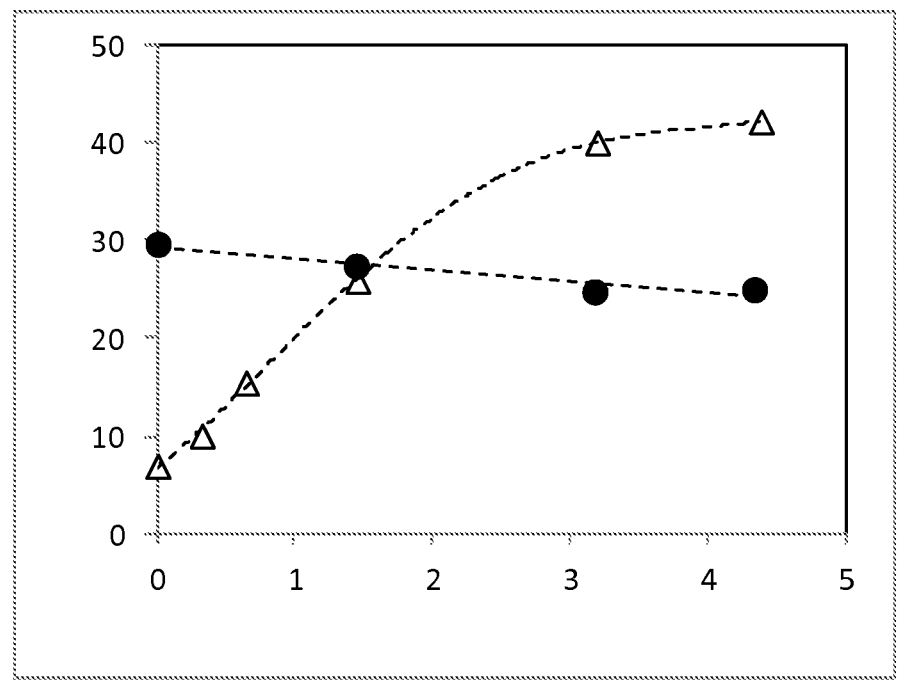
FIG. 2A is a graph corresponding to sample membranes prepared according to Example 2 with tributyl phosphate concentration plotted as a function of flux (gfd).
Figure 2B:
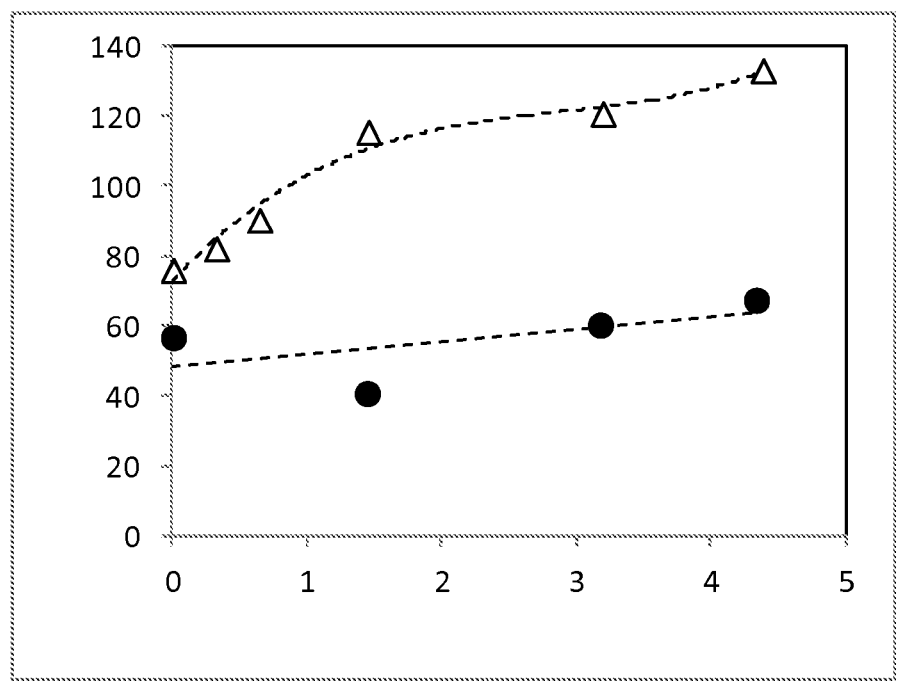
FIG. 2B is a graph corresponding to sample membranes prepared according to Example 2 with tributyl phosphate concentration plotted as a function of trimesoyl chloride consumption (mg/m$^2$) during interfacial polymerization.

Two series (i.e. Series 5 and 6) of sample membranes were prepared, with each series including samples made using different amounts of TBP (i.e. approx. 0 to 4 g/kg). The remaining reactant composition of each series is listed below in Table 1 along with a corresponding legend also used in FIGS. 2A-B. The resulting flux (gfd) and "TMC consumption" ($mg/m^2$) were determined for each sample and the results are plotted as a function of TBP concentration (g/kg) in FIGS. 2A and 2B, respectively. At the lower concentration of TMC (Series 5), flux and TMC consumption remained relatively unchanged despite variances in TBP concentration. However, at the higher concentration (Series 6), both flux and TMC consumption increased with increasing TBP concentration.

TABLE 1

| Example 1 | MPD (wt %) | TMC (wt/vol %) | TMC (wt %) | TBP (g/kg) | TBP/TMC stoichiometric ratio |
|---|---|---|---|---|---|
| Series 1: open circles (○): | 4.0 | 0.07 | 0.09 | 0.60 | 0.65 |
|  | 4.0 | 0.23 | 0.30 | 0.60 | 0.20 |
|  | 4.0 | 0.38 | 0.50 | 0.60 | 0.12 |
| Series 2: open squares (□): | 2.5 | 0.07 | 0.09 | 0.60 | 0.65 |
|  | 2.5 | 0.23 | 0.30 | 0.60 | 0.20 |
|  | 2.5 | 0.38 | 0.50 | 0.60 | 0.12 |
| Series 3: solid circles (●): | 3.5 | 0.09 | 0.12 | 0.00 | 0.00 |
|  | 3.5 | 0.21 | 0.28 | 0.00 | 0.00 |
|  | 3.5 | 0.30 | 0.39 | 0.00 | 0.00 |
| Series 4: solid squares (■): | 3.5 | 0.09 | 0.12 | 1.31 | 1.10 |
|  | 3.5 | 0.11 | 0.15 | 1.60 | 1.10 |
|  | 3.5 | 0.14 | 0.18 | 2.03 | 1.10 |
|  | 3.5 | 0.17 | 0.22 | 2.47 | 1.10 |
|  | 3.5 | 0.22 | 0.29 | 3.20 | 1.10 |
|  | 3.5 | 0.30 | 0.39 | 4.36 | 1.10 |
|  | 3.5 | 0.40 | 0.52 | 5.81 | 1.10 |

TABLE 1-continued

| Example 1 | MPD (wt %) | TMC (wt/vol %) | TMC (wt %) | TBP (g/kg) | TBP/TMC stoichiometric ratio |
|---|---|---|---|---|---|
| Series 5: solid circles (●): | 3.5 | 0.10 | 0.13 | 0.00 | 0.00 |
| | 3.5 | 0.10 | 0.13 | 1.44 | 1.09 |
| | 3.5 | 0.10 | 0.13 | 3.17 | 2.40 |
| | 3.5 | 0.10 | 0.13 | 4.33 | 3.27 |
| Series 6: open triangles (Δ): | 3.5 | 0.22 | 0.29 | 0.00 | 0.00 |
| | 3.5 | 0.22 | 0.29 | 0.32 | 0.11 |
| | 3.5 | 0.22 | 0.29 | 0.64 | 0.22 |
| | 3.5 | 0.22 | 0.29 | 1.45 | 0.50 |
| | 3.5 | 0.22 | 0.29 | 3.19 | 1.10 |
| | 3.5 | 0.22 | 0.29 | 4.38 | 1.51 |

The invention claimed is:

1. A method for making a composite polyamide membrane comprising a porous support and a thin film polyamide layer, wherein the method comprises the step of applying a polyfunctional amine monomer and polyfunctional acyl halide monomer to a surface of the porous support and interfacially polymerizing the monomers to form a thin film polyamide layer,
   wherein the step of applying the polyfunctional acyl halide monomer to the porous support comprises the step of combining the polyfunctional acyl halide monomer with a non-polar solvent at a concentration of 0.18 to 4 weight percent to form a coating solution which is applied to the surface of the porous support, and
   wherein the interfacial polymerization is conducted in the presence of a phosphate compound which is provided in a molar ratio of at least 1:1 with the polyfunctional acyl halide monomer, wherein the phosphate compound is represented by Formula (I):

Formula (I)

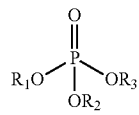

wherein $R_1$, $R_2$ and $R_3$ are independently selected from alkyl groups comprising from 1 to 10 carbon atoms, and
   wherein the interfacial polymerization is characterized by consuming at least 80 mg of the polyfunctional acyl halide monomer per square meter of polyamide membrane, and
   wherein polyfunctional amine monomer comprises m-phenylene diamine and the polyfunctional acyl halide comprises trimesoyl chloride.

2. The method of claim 1 wherein the polyfunctional acyl halide monomer and phosphate compound are combined within a single coating solution which is applied to the surface of the porous support.

3. The method of claim 1 wherein the polyfunctional acyl halide monomer is present in the coating solution at a concentration at least 0.24 weight percent.

4. The method of claim 1 wherein the polyfunctional acyl halide monomer is present in the coating solution at a concentration at least 0.22 weight percent.

5. The method of claim 1 wherein the polyfunctional acyl halide monomer is present in the coating solution at a concentration at least 0.28 weight percent.

6. The method of claim 1 wherein the composite polyamide membrane has a flux of at least 34.5 (gfd) when tested with an aqueous solution including 2000 ppm NaCl at 150 psi, pH8 and 25° C.

7. The method of claim 1 wherein the interfacial polymerization is characterized by consuming at least 95 mg of the polyfunctional acyl halide monomer per square meter of polyamide membrane.

8. The method of claim 1 wherein the interfacial polymerization is characterized by consuming at least 125 mg of the polyfunctional acyl halide monomer per square meter of polyamide membrane.

9. The method of claim 1 wherein the phosphate compound comprises tributyl phosphate.

* * * * *